US012586124B2

(12) United States Patent
Simmons

(10) Patent No.: US 12,586,124 B2
(45) Date of Patent: Mar. 24, 2026

(54) SYSTEM AND METHOD FOR FACILITATING THE RESALE OF GOODS

(71) Applicant: All-Tag Corporation, Boca Raton, FL (US)

(72) Inventor: Joshua Simmons, Chatsworth, GA (US)

(73) Assignee: All-Tag Corporation, Boca Raton, FL (US)

( * ) Notice: Subject to any disclaimer, the term of this patent is extended or adjusted under 35 U.S.C. 154(b) by 466 days.

(21) Appl. No.: 18/072,215

(22) Filed: Nov. 30, 2022

(65) Prior Publication Data

US 2023/0245218 A1 Aug. 3, 2023

Related U.S. Application Data

(60) Provisional application No. 63/300,379, filed on Jan. 18, 2022.

(51) Int. Cl.
*G06Q 30/00* (2023.01)
*G06Q 30/0283* (2023.01)
*G06Q 30/0601* (2023.01)

(52) U.S. Cl.
CPC ..... *G06Q 30/0641* (2013.01); *G06Q 30/0283* (2013.01); *G06Q 2220/00* (2013.01)

(58) Field of Classification Search
CPC ........... G06Q 30/0641; G06Q 30/0283; G06Q 2220/00; G06Q 30/0643; G06Q 30/06431; G06Q 30/06432; G06Q 30/06433; G06Q 30/06434; G06Q 30/06435; G06Q 30/0644; G06Q 30/06442; G06Q 30/06444

USPC ...................................................... 705/26, 27
See application file for complete search history.

(56) References Cited

U.S. PATENT DOCUMENTS

| | | | | |
|---|---|---|---|---|
| 11,374,756 | B1* | 6/2022 | Myers ................... | H04L 9/3213 |
| 2008/0133305 | A1 | 6/2008 | Yates et al. | |
| 2013/0024327 | A1* | 1/2013 | Nargizian .............. | G06Q 20/28 |
| | | | | 705/27.1 |
| 2017/0083959 | A1* | 3/2017 | Bousis ............... | G06Q 30/0643 |
| 2021/0248653 | A1* | 8/2021 | McKenzie ........... | H04L 9/3247 |
| 2021/0359996 | A1 | 11/2021 | Brown et al. | |
| 2022/0164839 | A1 | 5/2022 | Caylor et al. | |
| 2022/0188839 | A1 | 6/2022 | Andon et al. | |
| 2022/0294630 | A1 | 9/2022 | Collen | |
| 2023/0071093 | A1* | 3/2023 | Madhusudhan ... | G06Q 30/0601 |
| 2023/0109574 | A1* | 4/2023 | Vosseller ............. | G06Q 30/018 |
| | | | | 705/317 |

(Continued)

FOREIGN PATENT DOCUMENTS

| | | |
|---|---|---|
| KR | 102291483 B1 | 8/2021 |
| KR102291483B1MACHIN | | 8/2021 |

(Continued)

OTHER PUBLICATIONS

"Mattereum Protocol: Turning Code Into Law," mattereum.com 2018, 16pgs (Year: 2018).*

(Continued)

*Primary Examiner* — Robert M Pond
(74) *Attorney, Agent, or Firm* — Breiner & Breiner, L.L.C.

(57) ABSTRACT

There is disclosed a system and method for facilitating the resale of goods and providing digital identification for physical goods to facilitate the retail sale of the goods and the online resale of the goods.

11 Claims, 1 Drawing Sheet

(56) References Cited

U.S. PATENT DOCUMENTS

2024/0330905 A1* 10/2024 Kuwata ............. G06Q 30/0601

FOREIGN PATENT DOCUMENTS

KR          20220014052  A      2/2022
KR20220014052AMACHI        2/2022

OTHER PUBLICATIONS

Mattereum Web Site; The Wayback Machine—https://web.archive.
org/web/20201230212353/https://mattereum.com; 5pgs (Year: 2020).*
Anothertomorrow, Authenticated Resale, Dec. 31, 2022.
Archive, Archive Reclaim Resale, Dec. 31, 2022.
Vinay Gupta, Mattereum, Jun. 19, 2022.
Valaclava, Cyber Physical Gamewear Apparel, Dec. 31, 2022.
Maghan Mcdowell, Fashion's next NFT play: Twinning digital
NFTs to physical items, Jun. 7, 2022.

* cited by examiner

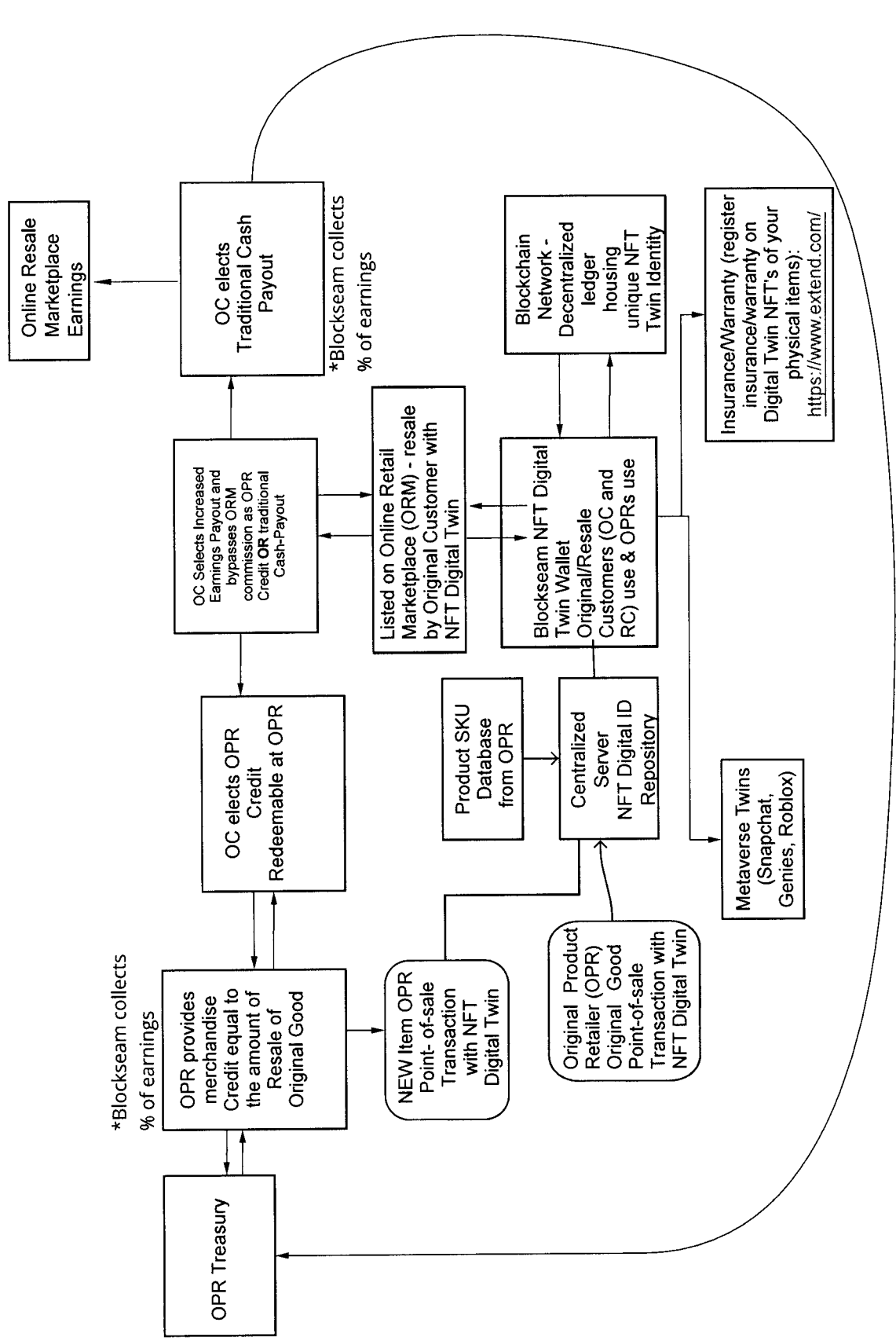

SYSTEM AND METHOD FOR FACILITATING THE RESALE OF GOODS

RELATED APPLICATION

This application claims benefit of U.S. Provisional Application Ser. No. 63/300,379, filed Jan. 18, 2022, entitled "System And Method For Facilitating The Resale Of Goods," which application is incorporated herein by reference in its entirety.

FIELD OF THE INVENTION

The present invention relates to a system and method for facilitating the resale of goods. More specifically, the invention relates to providing digital identification for physical goods through an NFT digital twin of the good to facilitate the retail sale of the goods and the online resale of the goods.

BACKGROUND OF THE INVENTION

There are a number of businesses who facilitate the resale of goods such as eBay®, Poshmark® and StockX®. These businesses broker the consumer-to-consumer secondary sales of goods over the internet whereby a first owner of the original goods may resell the goods to another consumer. One major problem in this industry is persons who have stolen the goods from an original store retailer and are selling the stolen goods online at a very reduced price. For the most part, the buyer of the stolen goods does not know that the goods are stolen and the goods do not come with a warranty or the like.

Another problem is the sale of counterfeit goods through the online retail marketplace. The buyer of the goods through an internet broker has no way of determining whether the goods are an original branded item or a counterfeit item, at least until they receive the goods after the sale is consummated. Or, the buyer has to rely on physical authenticity check protocols put in place by the resale marketplace. In this instance, the original brand owner loses a sale based on the counterfeit good and the purchaser of the counterfeit good loses out because the buyer believes he or she is purchasing an original brand good when he or she is in fact receiving a counterfeit good, which counterfeit good is usually of a lesser quality.

Presently, online resellers try to avoid these situations by obtaining a physical verification that the goods are not stolen or are original brand goods. However, because these sellers of stolen goods or counterfeit goods on the online resale marketplace are not honorable, they find ways to overcome the brokers attempt to verify the authenticity of the goods. Additionally, the cost economics of physically checking the authenticity and responsible ownership of items is burdensome and expensive, limiting the scope of items that can be protected.

These and other shortcomings of the known online resale of goods are addressed by the present invention.

SUMMARY OF THE INVENTION

The present invention is directed to a system and method for facilitating the resale of goods, including by providing a digital identification for physical goods through an NFT digital twin to facilitate retail transactions with respect to the goods. The terms used herein to describe the invention and in the claims have the following meanings:

(1) "Blockseam Brand System" or "Blockseam" or "Vendor" mean the entire system and method for facilitating the resale of goods through an Online Resale Marketplace, including the vendor of the system and method ("Vendor") and a Blockseam central server computer system used in the resale of goods, which includes any related decentralized networks directed to Blockseam's NFT digital twin smart contract offering ("Central Server");

(2) "Original Product Retailer" or "OPR" mean an in-store retailer of branded goods or an online store retailer of branded goods and may include a retailer solely for the branded goods, e.g. a Nike® store, or a retailer's authorized first-sale wholesale partner, e.g. a Nike® product sold at a Macy® store;

(3) "Original Good" means a good sold by an Original Product Retailer to an Original Customer, including a branded good;

(4) "Original Customer" means a person who purchases an Original Good from an Original Product Retailer;

(5) "Blockchain Network" means a business providing a method for creating an NFT digital twin of an Original Good ("NFT") and maintaining the NFT and each transaction involving the NFT in a Blockchain Network ledger, e.g. Polygon or Ethereum;

(6) "Online Resale Marketplace" or "ORM" mean a broker of consumer-to-consumer secondary sales of goods over the internet of which an Original Customer may sell an Original Good with its NFT to a Resale Customer, e.g. eBay®, Poshmark® or StockX®; and (7) "Resale Customer" means a person who purchases an Original Good from an Original Customer through an Online Resale Marketplace.

A primary object of the invention is to provide a system and method for facilitating the resale of goods.

Another primary object of the invention is to provide a system and method for facilitating the resale of goods whereby the public is protected from purchasing stolen goods or counterfeit goods.

Another primary object of the invention is to provide a system and method for facilitating the resale of goods which provides digital identification for physical goods to facilitate retail transactions of the first sale of the goods and the subsequent resale of the goods.

Another primary object of the invention is to provide Original Product Retailers, Online Resale Marketplaces, Original Customers and Resale Customers with the verification of an original brand good through an NFT digital twin which is initially created, i.e. minted, at the point-of-sale checkout of the purchase of an Original Good from an Original Product Retailer. Alternatively, the original creating of an NFT digital twin can also be created as part of the physical or digital checking/authentication processes of an Online Resale Marketplace.

Another primary object of the invention is to provide an NFT digital twin of an Original Good for resale with the Original Good on an Online Resale Marketplace to ensure the authenticity of the good.

Another primary object of the invention is to provide mutual economic incentives for the original and responsibly owned goods by consumers, retail stores, retail brands and Online Resale Marketplaces.

Another primary object of the invention is to provide NFT digital identification for physical goods that facilitate the authentic retail sale of the goods and subsequent online resale of the goods. This provides an Original Customer with the unique right and incentive, facilitated in conjunction with a first-sale Original Product Retailer and a participating Online Resale Marketplace, to leverage a NFT smart contract OPR funded rebate that bypasses resale commissions typically required by Online Resale Marketplaces, e.g. ranging from 10-25% of the item sale. The Original Product Retailer is incentivized to participate in Blockseam due to the future sales to an Original Customer based on a redeemable credit from the OPR based on the resale of the Original Good. In this new optional payout model for Original Customers, i.e. online sellers, the Blockseam NFT digital twin's smart contract facilitates the OPR's coverage of the Original Customer's usual resale marketplace commission to the ORM. The Online Resale Marketplace will remit the Original Customer's resale payout to OPR, minus the ORM's commission. The OPR then provides the Original Customer with a redeemable store credit at the OPR for 100% of the resale payout, i.e. covering the commission to the ORM, to obtain a new sale from the Original Customer.

Another primary object of the invention is to provide a system to facilitate the responsible trade with NFT smart contract payouts for an Original Customer, redeemable at an Original Product Retailer.

The present invention is directed to a system and method for facilitating the resale of goods comprising a Blockseam Central Server used to facilitate the resale of an Original Good; an Original Product Retailer having an account with Blockseam; a Blockchain Network having an account with Blockseam; an Online Retail Marketplace having an account with Blockseam; and the Central Server having a computer network connected with the computer network of the Online Product Retailer, the Blockchain Network and the Online Retail Marketplace. The Original Product Retailer sells an Original Good to an Original Customer and allows the Original Customer to purchase or obtain free of charge an NFT digital twin of the Original Good. When opting to obtain the NFT, the Original Customer provides identification information ("Identifying Information") to Blockseam and which information is entered into the Central Server for communication with the Original Customer. The Blockseam Central Server notifies the Blockchain Network which creates and stores an NFT digital twin of the Original Good on a ledger. The Original Customer may resell on the Online Retail Marketplace the Original Good and the NFT thereof. When doing so, the Original Customer (now seller) may receive the cash sale amount minus the Online Retail Marketplace commission for brokering the sale, i.e. the traditional legacy payout model, or receive the full sale price, or more (e.g. depending on further OPR rebates facilitated by Blockseam), as a merchandise credit redeemable at the Original Product Retailer or an OPR partner. If the Original Customer chooses the merchandise credit, the Original Product Retailer receives the resale price minus the ORM's commission as a part of the transaction conducted by the Online Resale Marketplace, i.e. an advance on future sales to the OPR by the Original Customer using the incentivized merchandise credit. As part of the Blockseam NFT smart contract governing this transaction between all parties, the Original Product Retailer provides the Original Customer with a redeemable merchandise credit for the full resale price of the Original Good, e.g. similar to the OPR's use of a Gift Card program, for use by the OPR's Original Customer back in the original retail sales channel.

These primary and other objects of the invention will be apparent from the following description of the preferred embodiments of the invention and from the accompanying drawing.

BRIEF DESCRIPTION OF THE DRAWING

The following detailed description of the specific non-limiting embodiments of the present invention can be best understood when read in conjunction with the following drawing.

Referring to the drawing:

FIG. 1 is a block diagram generally illustrating the system and method for facilitating the retail sale of goods and the online resale of goods.

DETAILED DESCRIPTION OF THE PREFERRED EMBODIMENTS

The present invention is directed to a system and method for facilitating the sale of goods and the online resale of goods, including by providing a digital identification for physical goods to facilitate retail transactions with respect to the goods. The invention is generally shown in FIG. 1 and as described herein.

The Blockseam Brand System facilitates the online resale of goods to ensure that the goods are original branded goods, e.g. not stolen or counterfeit, by economic incentives and the responsible creating of an NFT digital twin at an authorized Original Product Retailer's first sale of the goods. Blockseam also may be used for the resale of goods by originally creating the NET digital twin as part of an existing Online Resale Marketplace authentication protocol, e.g. the eBay® Authentication Guarantee where eBay® employees physically verify that the goods are genuine goods before an Original Customer's Original Good flows to a Resale Customer. The Blockseam Brand System benefits Original Customers, Original Product Retailers, Online Resale Marketplaces, and Resale Customers, providing each a return on investment that is improved from the standard online resale of goods now used in the market. Blockseam will work with multiple Original Product Retailers, the OPR's obtaining accounts with the Blockseam Brand System. Blockseam may solicit Original Product Retailers or OPRs may solicit Blockseam.

When an Original Product Retailer has a Blockseam account, the OPR will sell an Original Good to an Original Customer. At checkout, the Original Product Retailer will give the Original Customer the option to obtain an NFT digital twin of the Original Good, i.e. a digital twin of the Original Good along with its associated smart contract rights and privileges. This can be at no cost or cost to the Original Customer. If the Original Customer opts into the Blockseam Brand System, the Original Product Retailer, through its computer system, will contact the Blockseam Central Server to have an NFT created for the Original Good. Blockseam, through its Central Server, interacts with the Blockchain Network to have the NFT created for the Original Good, thereafter providing the NFT digital twin and the pertinent information to Blockseam. Blockseam will keep an account of each transaction.

At the time the Original Customer opts into the Blockseam Brand System, the Original Customer will provide Identifying Information such as their name and email address which Blockseam will store in its Central Server along with a file for the Original Customer with all pertinent information for the Original Good and the NET, e.g. date of purchase, SKU, etc. The Identifying Information can be based on KYC (know-your customer) guidelines, or be anonymous, and is not limited in scope to name and email.

When the Original Customer decides to sell the Original Good through an Online Resale Marketplace, the Original Customer will offer for sale both the Original Good and the NFT, thereby confirming the authenticity and provenance of the Original Good and increasing the value of the Original Good with the NFT digital twin's rights and privileges. The Online Resale Marketplace must also have an account with Blockseam and be part of the Blockseam Brand System. Blockseam and the ORM will communicate through the Blockseam Central Server and the ORM computer network.

A Resale Customer, i.e. the buyer, may purchase the Original Good and the NFT digital twin through the Online Resale Marketplace from the Original Customer, i.e. the seller, the NFT guaranteeing the authenticity of the Original Good and increasing the value and, therefore, the sale price of the Original Good. Presently, an Online Retail Marketplace charges a commission to the Original Customer for brokering the sale of the goods, often 20% thereby giving the Original Customer 80% of the purchase price paid by the Resale Customer. Under the Blockseam Brand System, the Original Customer may choose to proceed under this conventional method; or the Original Customer may choose to obtain 100% (or another amount as negotiated between the Original Product Retailer and the Original Resale Marketplace and facilitated by Blockseam) of the purchase price as a merchandise credit for a new Original Good from the Original Product Retailer or an OPR partner. The right to bypass the marketplace commission as outlined is a key aspect of the Blockseam system by intrinsically incentivizing each party in the goods resale ecosystem to work together.

In another aspect of the invention, the Original Customer may choose a merchandise credit to another unaffiliated retail brand retailer as payout for the Original Good, depending on the Original Product Retailer's desire to partner and economically benefit, e.g. receive a commission, from the sale of goods outside of their own in-house sales channels.

To illustrate the Blockseam Brand System and the benefits to each of the users of the system, the following examples are provided.

Example 1

Original Good: Nike® Air Jordan® Shoes
Original Product Retailer: Nike® Store
Online Resale Marketplace: StockX®
Original Customer (Seller): Jane Doe
Resale Customer (Buyer): John Black 1. Jane Doe buys a pair of Nike® Air Jordan® shoes for $150 at the Nike® store. The Nike® Store has an account with Blockseam. At the checkout of this purchase, i.e. point-of-sale at the Nike® Store, Jane opts into also claiming a free NFT digital twin of the shoes as part of her checkout experience.
2. Six months later, Jane decides to sell her gently worn Air Jordan® shoes for $100 on StockX® with the NFT digital twin to a Resale Customer. StockX® has an account with Blockseam.
3. John Black browses StockX® and decides to purchase Jane's Air Jordan® shoes for $100 through StockX® along with the NFT digital twin.
4. Through the Blockseam Brand System, leveraging the NFT digital twin and an associated smart contract, Jane is given the option to (a) sell the Air Jordan® shoes on StockX® and take 80% ($80) as cash-value, paying a $20 commission to StockX®, or (b) receive 100% ($100) as a merchandise credit redeemable at any Nike® Store or Nike.com. Additionally, Nike® may also allow Jane to redeem the credit at a Nike® partner only for Nike® merchandise, such as Foot Locker®, who also participates in Blockseam. Additionally, Nike® may also allow Jane to redeem the credit at a Nike® partner such as Dick's Sporting Goods®, who also participates in Blockseam, and not require the purchase of Nike® Merchandise, but instead the purchase of any item at Dick's®. In this scenario, Dick's® would agree to provide Nike® a commission for driving a non-Nike® sale of any good in their store or online. All of this is facilitated by the NFT smart contract associated with Blockseam.

5. In this instance, Jane chooses the $100 brand credit at the Nike® Store. When she uses the brand credit to purchase a new Original Good, the Blockseam Brand System process repeats itself with the creating of another NFT digital twin, thereby creating a recurring flywheel of economic incentive for the Nike® Store.
6. John Black now owns the Nike® Air Jordan® shoes and the NFT digital twin. At the transaction, Blockseam records the change of ownership and obtains John Black's Identifying Information, if John Black doesn't already have a Blockseam account, and thereafter associating John Black's information with that Original Good. John may thereafter resell the Nike® Air Jordan® shoes on StockX® or another ORM participating in the Blockseam system, and the NFT digital twin using the Blockseam Brand System.

Original Customers benefit from the Blockseam Brand System, including as follows: (a) the customer is provided with a new payout option that bypasses the conventional marketplace commission fees, the higher the item's value, the more compelling this gets; and (b) increased earnings as their items will sell for more with a NFT digital twin, versus other sellers who don't have the NFT to verify authenticity or convey the additional rights and privileges associated with it. The ORM's "For Sale Online Listings" directed to potential Resale Customers will see reference to an "NFT Certified" moniker, or any similar term that conveys these rights and privileges, with a "What's This" click through icon to explain these benefits, which organically increase resale values.

Resale Customers (buyers) benefit from the Blockseam Brand System, including as follows: (a) a NFT digital twin is generated in the name of the Resale Customer providing all of the aforementioned benefits received by the Original Customer; and (b) the Resale Customer has the peace-of-mind of knowing that the Original Good is authentic and not stolen or a counterfeit.

Original Product Retailers benefit from the Blockseam Brand System, including as follows: (a) new monetization of their goods throughout their lifecycle on Online Resale Marketplaces; (b) when the Original Customer accepts a credit from the Original Retail Store and bypasses the online commission, the Original Retail Store is happy to receive the Original Customer's resale payout, minus the commissions, and convert that to a merchandise credit, by adding the additional rebate that covers the ORM's commission previously deducted. This in turn drives a new item sale in their store with the corresponding profit margin; and (c) even if the Original Customer accepts a conventional cash-payout as has always existed, Online Resale Marketplaces may optionally share a small percentage of their commission with the Original Product Retailer, e.g. as an "affiliate commission."

Online Retail Marketplaces benefit from the Blockseam Brand System, including as follows: (a) new payout methods for sellers which drives loyalty; (b) seller/buyer engagement that will drive more sales volume and the use of their platform over those of competitors; and (c) as goods sell for more on their marketplace due to the NFT digital twins, versus goods that don't have them, their earnings increase incrementally.

Example 2

Original Good: Judith Leiber® Clutch—$1,000
Original Product Retailer: JudithLeiber.com®
Online Resale Marketplace: Poshmark®
Original Customer (Seller): Sally Doe
Resale Customer (Buyer): Betty Blue
JudithLeiber.com® and Poshmark® have accounts with Blockseam.

1. Sally Doe buys a clutch for $1,000 at JudithLeiber-.com® with a 50% margin on the clutch for JudithLeiber.com®. At the checkout of this purchase, Sally opts into also claiming a free NFT digital twin as part of her checkout experience at the JudithLeiber.com® point-of-sale.
2. Two years later, Sally decides to sell her slightly used clutch for $400 on Poshmark® with the NET digital twin to a Resale Customer. Similar Judith Leiber® clutches without the digital twin sell for $200.
3. Betty Blue browses Poshmark® and decides to purchase Sally's Judith Leiber® clutch for $400 through Poshmark® along with the NFT which features the NFT digital twin and its associated rights and privileges.
4. Through the Blockseam Brand System and the NFT digital twin, Sally is given the option
   (a) to sell the Judith Leiber® clutch on Poshmark® and take 80% ($320) as cash-value, with Poshmark® deducting an $80 commission. Under this option JudithLeiber.com® receives $20 (25%) of the marketplace commission and Poshmark® keeps $60 (75%) or Poshmark® keeps 100% of the marketplace commission as they always have and shares nothing with Judith Leiber® (depending on negotiations between Poshmark® and Judith Leiber®). Online Resale Marketplaces (Poshmark®) may share in cash-payouts to drive loyalty and incremental sales in exclusive or preferred resale partner arrangements with OPRs (Judith Leiber®); or
   (b) receive 100% ($400) or higher, e.g. (110%), as brand merchandise credit redeemable at the JudithLeiber.com® online store or in-store.
5. In this instance, Sally chooses the brand merchandise credit.

In this scenario: Judith Leiber® actually receives the 80% payout ($320) as an advance on future sales and converts this to a redeemable merchandise credit for the entire resale amount for the Original Customer; which Poshmark® would have normally sent directly to the Original Customer (Seller). The full commission that's usually deducted by Poshmark® from Sally is still retained by Poshmark® ($80). When Judith Leiber® receives the advance on future sales, they add the 20% ($80) amount Poshmark® took as a marketplace commission to the Original Customer (Sellers) merchandise credit value. Sally now has no commission deducted and retains 100% of the value of her resale on Poshmark® as Merchandise Credit at Judith Leiber®.

Poshmark® still receives their full commission payout based on the Original Good's final sale value, while in conjunction with Judith Leiber® via the Blockseam System and NFT smart contract governing the transaction, providing Sally with a payout that bypasses their traditional 20% marketplace commission, driving loyalty for both Poshmark® and Judith Leiber®.

Poshmark® keeps their standard commission take rate (20% of the sale) and remits the rest as an advance on future sales to JudithLeiber.com®. The OPR, Judith Leiber®, receives the advance on future sales and adds the marketplace commission balance Poshmark® took, converting this balance into merchandise credit which is only redeemable as an Original Product Retailer credit to the Original Customer, Sally, and redeemable at Judith Leiber®. Sally now receives $400 in Judith Leiber® store credit or more if Judith Leiber® chooses to incentivize sellers and users of the Blockseam System, with many first-sale margin structures supporting such. This $400 Judith Leiber® merchandise credit drives a new and incremental item sale with a 50% (or more) margin to Judith Leiber®. Judith Leiber® received an advance of future sales and in return covers the $80 marketplace commission to drive that new item sale: $400 in merchandise credit with a 50% margin is $200 in gross profit and $120 in net profit after the $80 marketplace commission deduction. This does not factor in that a consumer may make a higher purchase or purchase additional items at JudithLeiber.com®, further capturing additional sales and margin. The Resale Customer may then repeat the process.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A system for facilitating the resale of goods on an Online Retail Marketplace by confirming the authenticity of the goods through the purchase of an NFT digital twin of the goods at the first point of sale of the goods from an Original Product Retailer comprising
   a Vendor having a Vendor Central Server used to facilitate the resale of an Original Good, wherein the Vendor Central Server includes a non-transitory computer-readable medium;
   the Original Product Retailer having an account with the Vendor;
   the Online Retail Marketplace having an account with the Vendor;
   a Blockchain Network having an account with the Vendor;
   the Vendor Central Server having a computer network connected with the computer network of the Original Product Retailer, the Blockchain Network and the Online Retail Marketplace;
   wherein, the Original Product Retailer sells the Original Good to an Original Customer and allows the Original Customer to opt to obtain the NFT digital twin ("NFT") of the Original Good;
   wherein, if the Original Customer opts to obtain the NFT, the Original Customer provides identification information to the Vendor and the identification information is entered into and stored on the Vendor Central Server;

wherein, the Vendor Central Server thereafter notifies the Blockchain Network that the Original Customer has opted to obtain the NFT of the Original Good and the Blockchain Network creates and stores the NFT of the Original Good in a Blockchain Network ledger having a non-transitory computer-readable medium;

wherein, if the Original Customer resells the Original Good and the NFT thereof on the Online Retail Marketplace to a Resale Customer for an agreed upon price, the transaction is recorded and stored on the Vendor Central Server;

wherein, the Original Customer is given the option of receiving either the agreed upon price minus an Online Retail Marketplace commission for brokering the sale or an agreed upon merchandise credit redeemable from the Original Product Retailer or a partner of the Original Product Retailer;

wherein, when the Original Customer selects the merchandise credit, the Original Product Retailer receives a share of the agreed upon purchase price as an advance on a future sale to the Original Customer using the merchandise credit, and the Online Resale Marketplace receives an agreed upon commission from the agreed upon purchase price for brokering the resale of the Original Good; and optionally the Resale Customer's identification information is entered and stored into the Vendor Central Server and the NFT entered into the Blockchain Network ledger in the name of the Resale Customer.

2. The system for facilitating the resale of goods of claim 1 wherein when the Original Customer selects paying a commission to the Online Retail Marketplace and the Online Retail Marketplace pays an agreed upon amount of the commission to the Original Product Retailer.

3. The system for facilitating the resale of goods of claim 1 wherein the agreed upon merchandise credit redeemable from the Original Product Retailer or partner of the Original Product Retailer is the full resale price of the Original Good.

4. The system for facilitating the resale of goods of claim 1 wherein the agreed upon merchandise credit redeemable from the Original Product Retailer or partner of the Original Product Retailer is greater than the resale price of the Original Good.

5. The system for facilitating the resale of goods of claim 1 wherein the Original Customer redeems the merchandise credit from the Original Product Retailer or a partner of the Original Product Retailer and purchases a new Original Good from the Original Product Retailer and opts to obtain an NFT for the new Original Good and the system repeats itself.

6. A method for facilitating the resale of goods on an Online Retail Marketplace by confirming the authenticity of the goods through the purchase of an NFT digital twin of the goods at the first point of sale of the goods from an Original Product Retailer comprising a. providing the following participants a Vendor having a Vendor Central Server used to facilitate the resale of an Original Good, wherein the Vendor Central Server includes a non-transitory computer-readable medium;

the Original Product Retailer having an account with the Vendor;

the Online Retail Marketplace having an account with the Vendor;

a Blockchain Network having an account with the Vendor;

b. wherein the Vendor Central Server having a computer network connected with the computer network of the Original Product Retailer, the Blockchain Network and the Online Retail Marketplace;

c. wherein the Original Product Retailer sells the Original Good to an Original Customer and allows the Original Customer to opt to obtain an NFT digital twin ("NFT") of the Original Good;

d. wherein, if the Original Customer opts to obtain the NFT, the Original Customer provides identification information to the Vendor and the identification information is entered into and stored on the Vendor Central Server;

e. wherein the Vendor Central Server thereafter notifies the Blockchain Network that the Original Customer has opted to obtain the NFT of the Original Good and the Blockchain Network creates and stores the NFT of the Original Good in a Blockchain Network ledger having a non-transitory computer-readable medium;

f. wherein, if the Original Customer resells the Original Good and the NFT thereof on the Online Retail Marketplace to a Resale Customer for an agreed upon price, the transaction is recorded and stored on the Vendor Central Server;

g. wherein the Original Customer is given the option of receiving either the agreed upon price minus an Online Retail Marketplace commission for brokering the sale or an agreed upon merchandise credit redeemable from the Original Product Retailer or a partner of the Original Product Retailer;

h. wherein, if when the Original Customer selects the merchandise credit, the Original Product Retailer receives a share of the agreed upon purchase price as an advance on a future sale to the Original Customer using the merchandise credit, and the Online Resale Marketplace receives an agreed upon commission from the agreed upon purchase price for brokering the resale of the Original Good; and i. optionally the Resale Customer's identification information is entered into and stored on the Vendor Central Server and the NFT entered into the Blockchain Network ledger in the name of the Resale Customer.

7. The method for facilitating the resale of goods of claim 6 wherein when the Original Customer selects paying a commission to the Online Retail Marketplace and the Online Retail Marketplace pays an agreed upon amount of the commission to the Original Product Retailer.

8. The method for facilitating the resale of goods of claim 6 wherein the agreed upon merchandise credit redeemable from the Original Product Retailer or partner of the Original Product Retailer is the full resale price of the Original Good.

9. The method for facilitating the resale of goods of claim 6 wherein the agreed upon merchandise credit redeemable from the Original Product Retailer or partner of the Original Product Retailer is greater than the resale price of the Original Good.

10. The method for facilitating the resale of goods of claim 6 wherein the Original Customer redeems the merchandise credit from the Original Product Retailer or a partner of the Original Product Retailer and purchases a new Original Good from the Original Product Retailer and opts to obtain an NFT for the new Original Good and the method repeats itself.

11. A non-transitory computer-readable medium of a Vendor that, when executed by a Vendor Central Server computing system, causes the computer system to perform a method comprising:

receiving from an Original Product Retailer a request from an Original Customer purchasing an Original Good to obtain an NFT digital twin ("NFT") of the Original Good for authenticating the subsequent resale of the Original Good on an Online Retail Marketplace;

receiving the Original Customer's identifying information and storing it in the Vendor Central Server;

generating instructions from the Vendor Central Server to a Blockchain Network having an account with the Vendor to create and store the NFT of the Original Good and wherein the Blockchain Network generates the NFT of the Original Good and stores the NFT in a Blockchain Network ledger having a non-transitory computer-readable medium;

wherein, if the Original Customer resells the Original Good and the NFT thereof on the Online Retail Marketplace to a Resale Customer for an agreed upon price, the transaction is recorded and stored on the Vendor Central Server;

wherein, the Original Customer is given the option of receiving either the agreed upon price minus an Online Retail Marketplace commission for brokering the sale or an agreed upon merchandise credit redeemable from the Original Product Retailer or a partner of the Original Product Retailer;

wherein, when the Original Customer selects the merchandise credit, the Original Product Retailer receives a share of the agreed upon purchase price as an advance on a future sale to the Original Customer using the merchandise credit, and the Online Resale Marketplace receives an agreed upon commission from the agreed upon purchase price for brokering the resale of the Original Good; and optionally the Resale Customer's identification information is entered into and stored on the Vendor Central Server and the NFT entered into the Blockchain Network ledger in the name of the Resale Customer.

* * * * *